Figure 7:
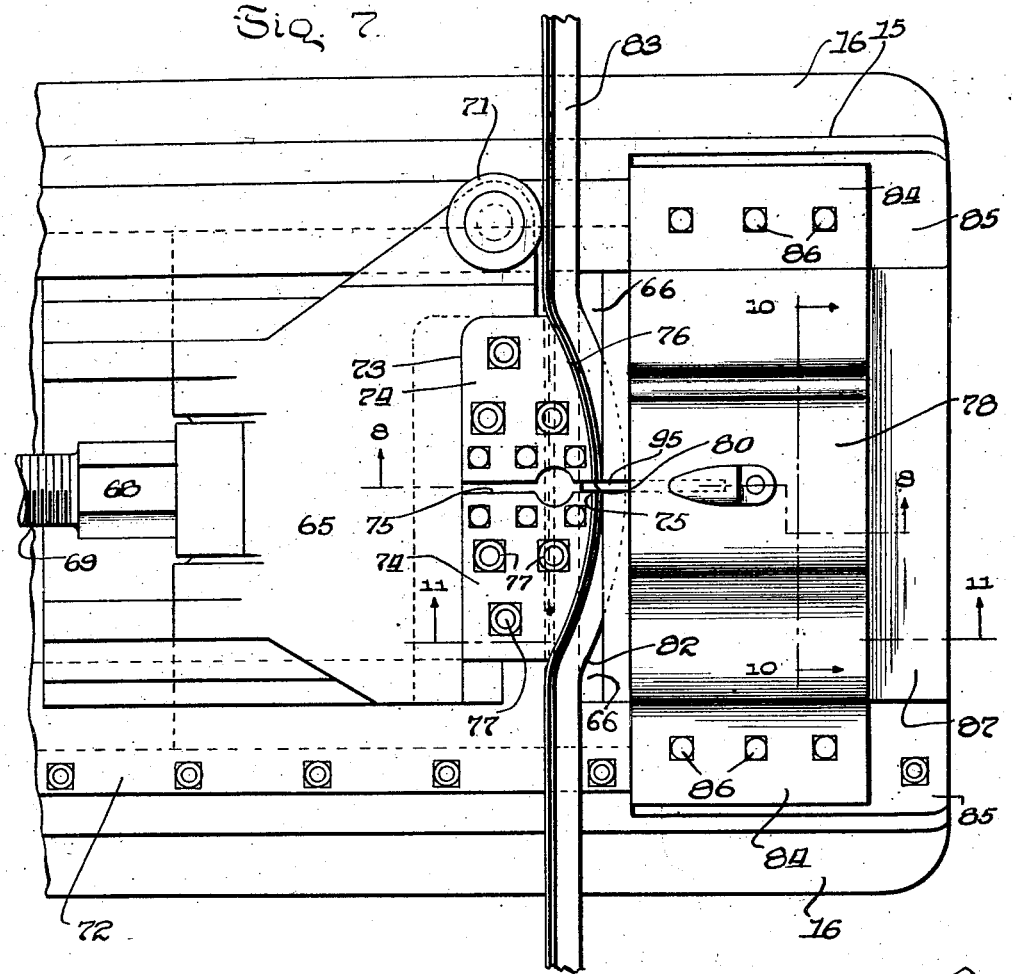

Aug. 19, 1930.   O. H. SLAFTER   1,773,647
FORMING AND CUTTING MACHINE
Filed June 20, 1928   8 Sheets-Sheet 1
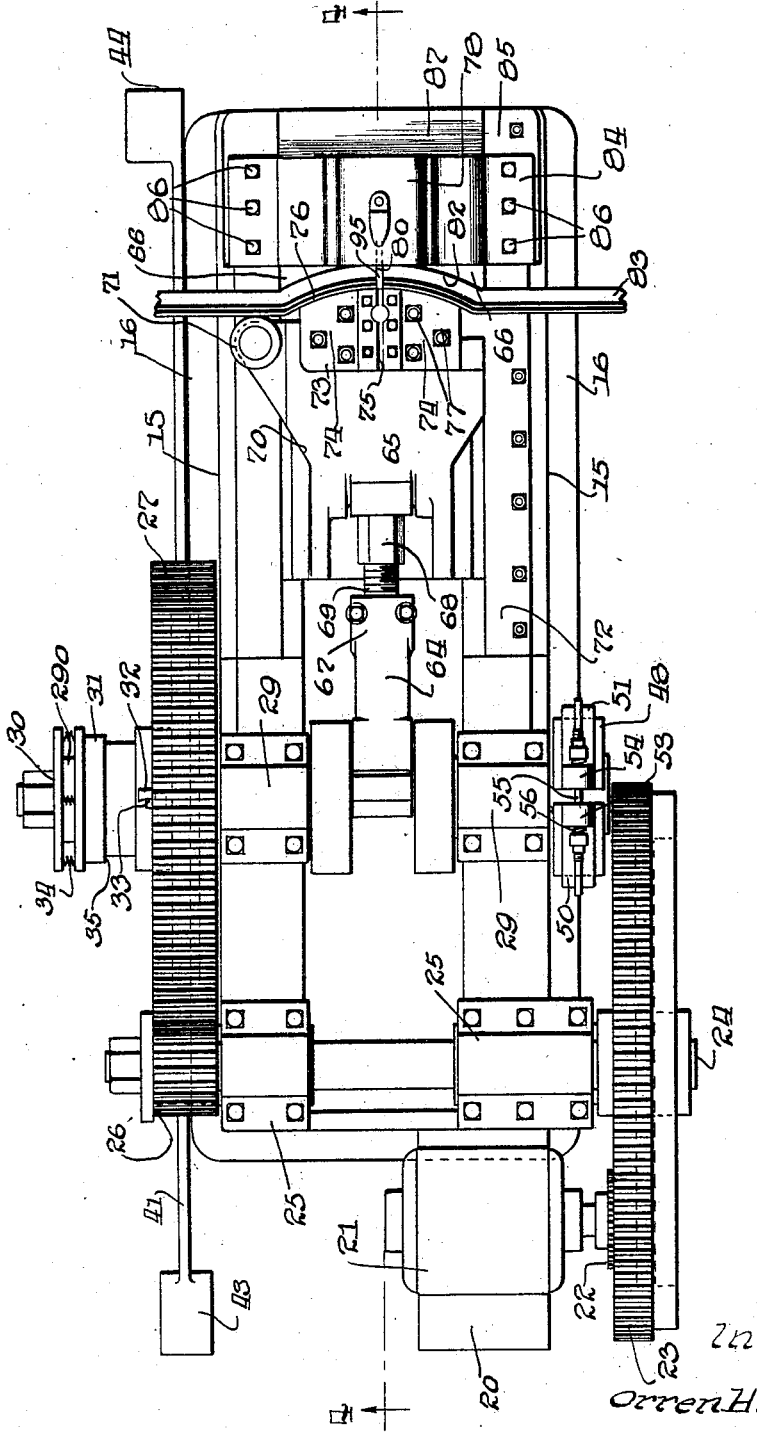
Witness
William P. Kilroy
Inventor,
Orren H. Slafter
By George J. Haight
Attys

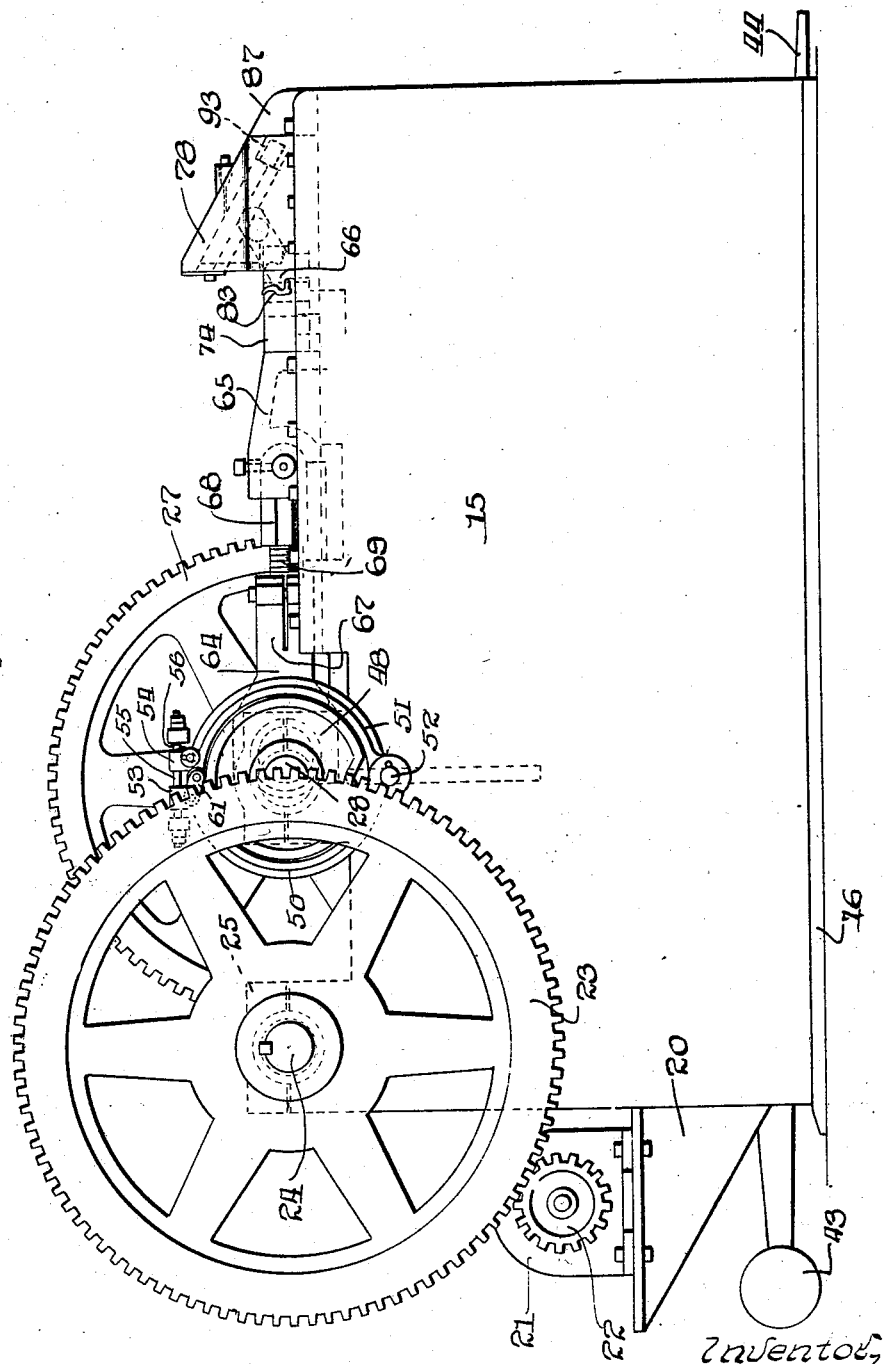

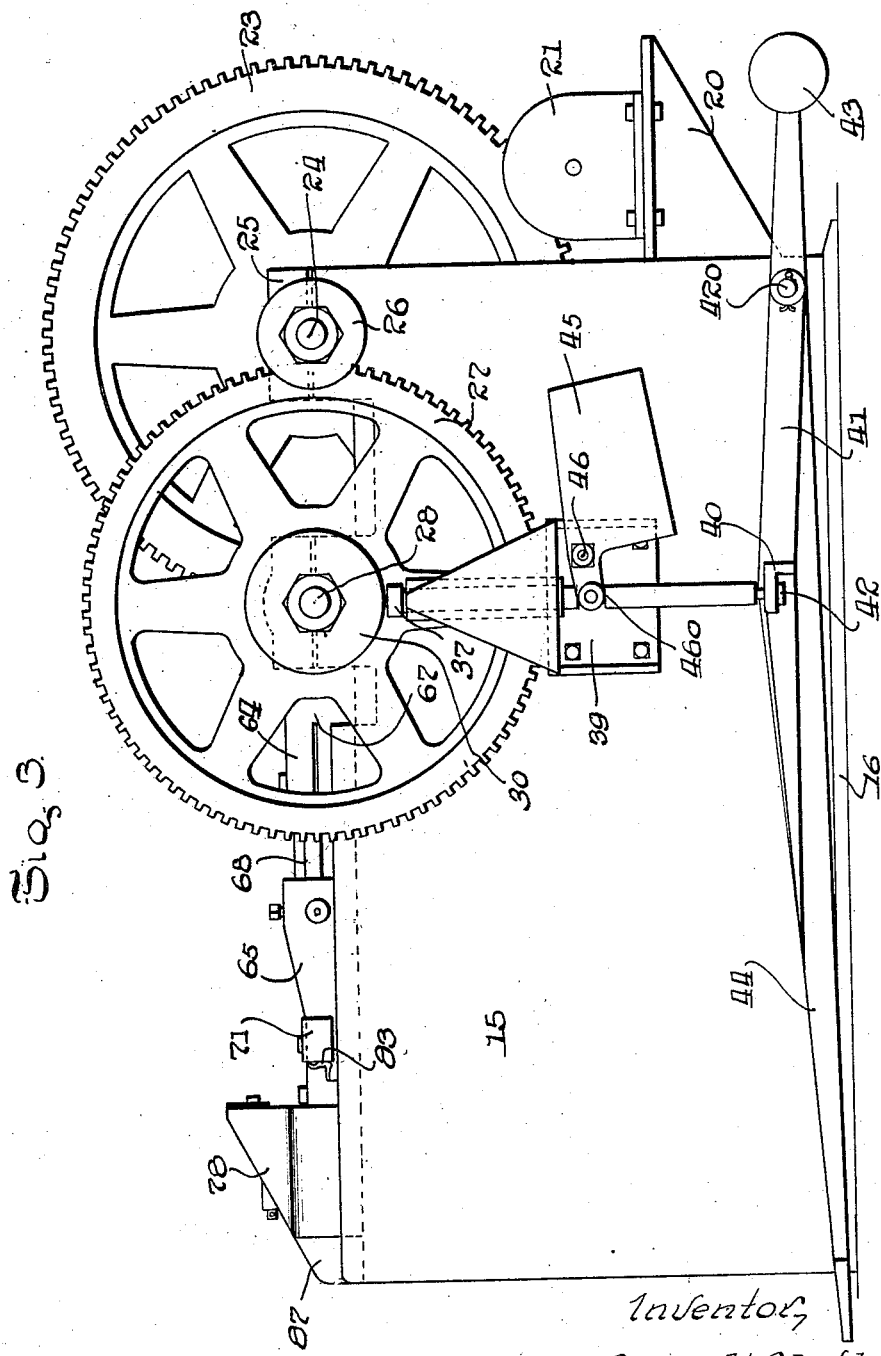

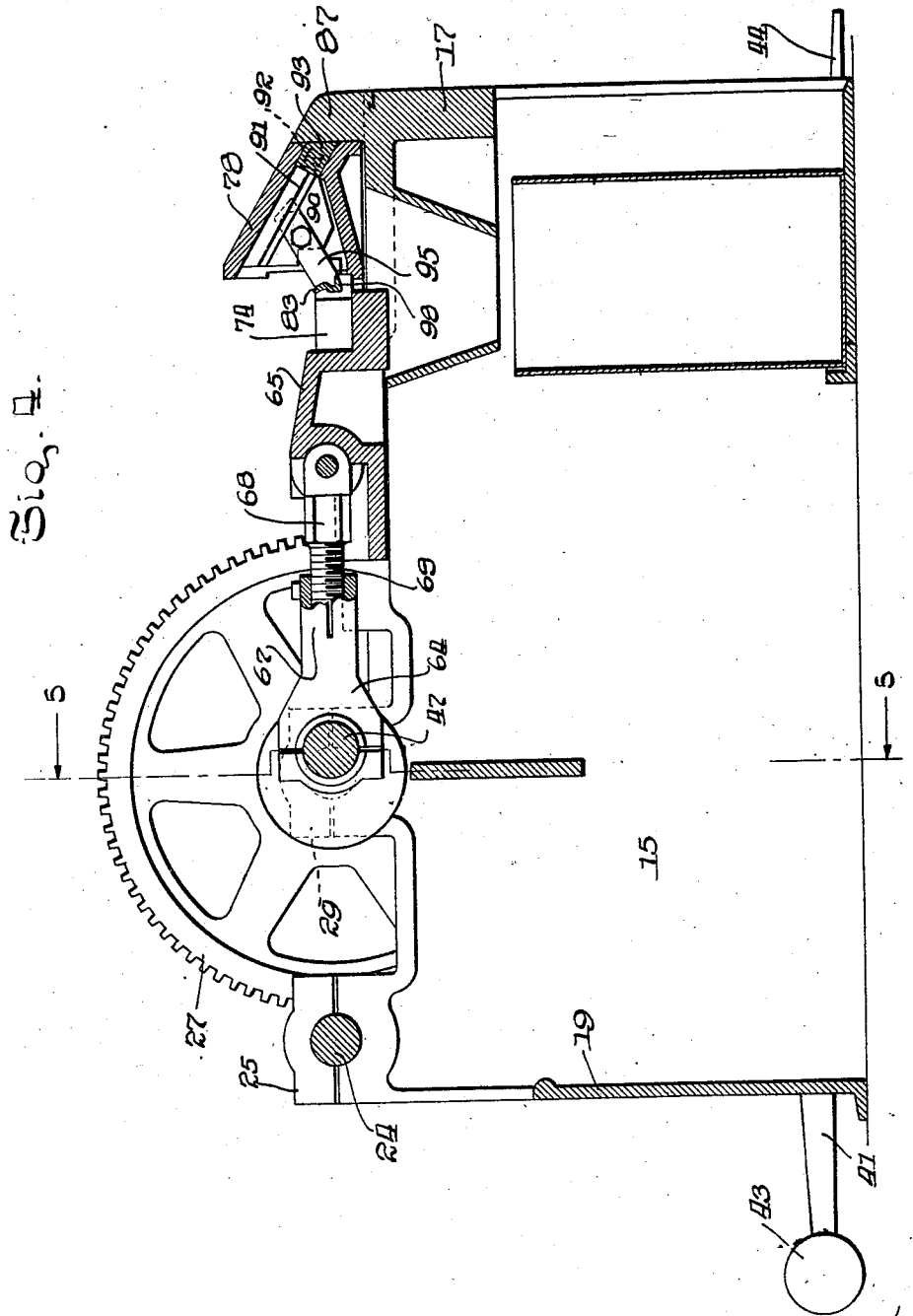

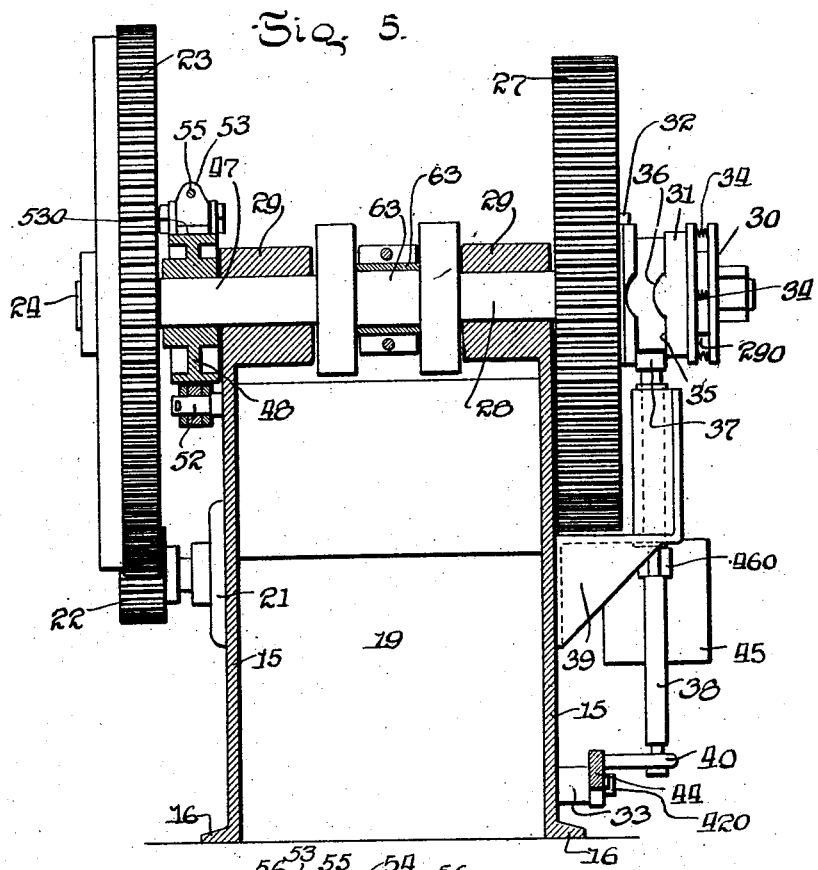
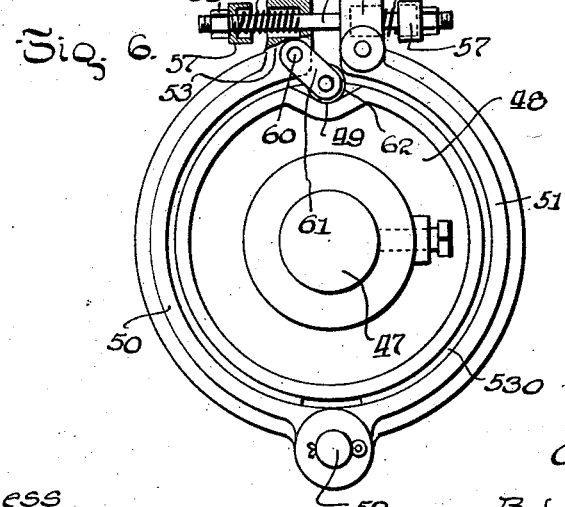

Aug. 19, 1930. O. H. SLAFTER 1,773,647
FORMING AND CUTTING MACHINE
Filed June 20, 1928 8 Sheets-Sheet 6

Witness
William P. Kilroy

Inventor,
Orren H. Slafter
By George I. Haight
Atty

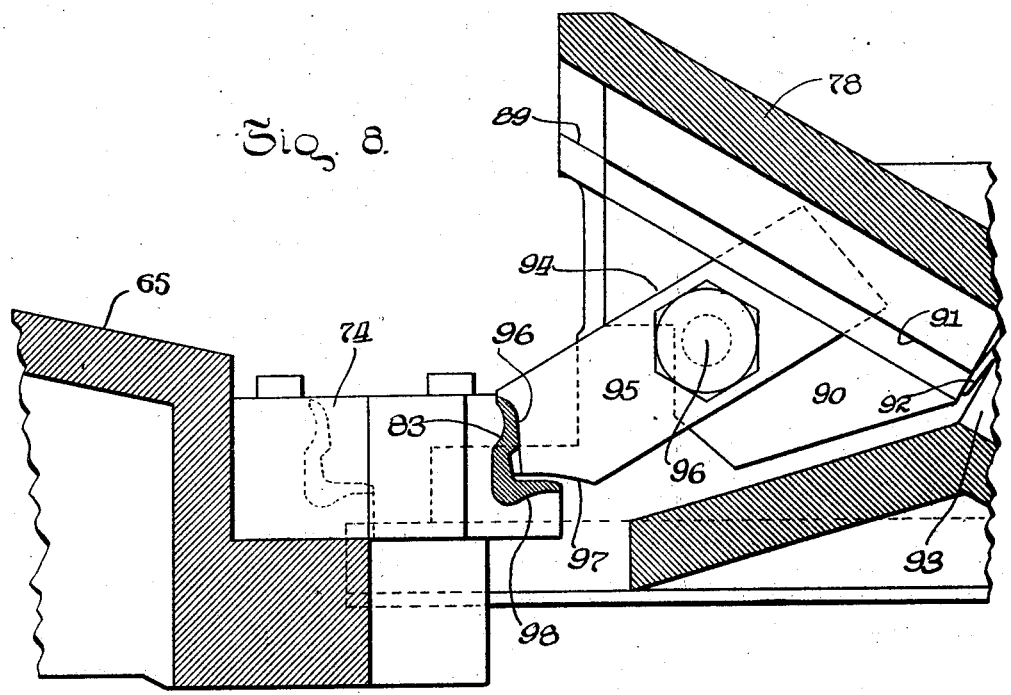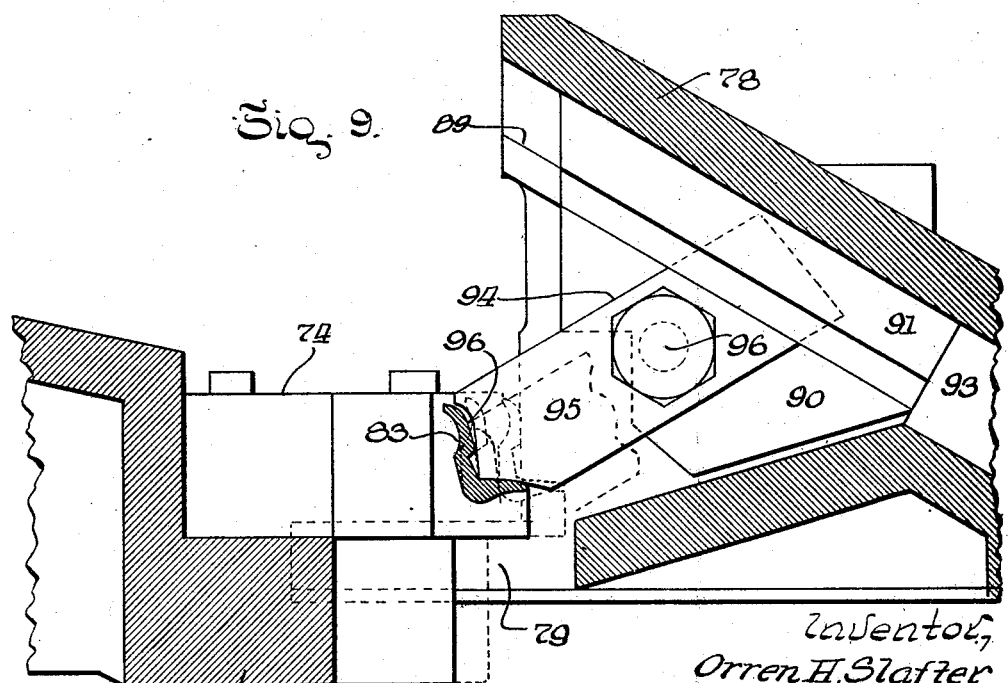

Aug. 19, 1930.  O. H. SLAFTER  1,773,647
FORMING AND CUTTING MACHINE
Filed June 20, 1928  8 Sheets-Sheet 8

Witness
William P. Kilroy

Inventor
Orren H. Slafter
By George T. Haight
Atty.

Patented Aug. 19, 1930

1,773,647

UNITED STATES PATENT OFFICE

ORREN H. SLAFTER, OF LOS ANGELES, CALIFORNIA, ASSIGNOR TO BOYLE MANUFACTURING COMPANY, INC., OF LOS ANGELES, CALIFORNIA, A CORPORATION OF CALIFORNIA

FORMING AND CUTTING MACHINE

Application filed June 20, 1928. Serial No. 286,827.

This invention relates to improvements in forming and cutting machines.

In the manufacture of chime rings and similar articles, it has been the general practice to form the bars or beams, from which the chimes are made, into a circular or ring-like form by passing the bar between the usual set of three bending rolls. A difficulty encountered in this procedure is that the entire bar or beam is not bent to a true circle by the forming rolls, the leading end, as well as the end last to leave the bending rolls, remaining substantially straight for an appreciable distance, which requires separate bending and forming the of the ends to true circular form subsequent to the main bending operation. It is the present practice to form the body portion of the bar in a circular shape, and afterwards form the ends to circular shape, and this is extremely difficult because in forming the ends the remaining portion of the ring-like bar is distorted; in addition it is found very difficult to form the ends to true circular form and much labor is required to perform this operation, adding greatly to the cost of manufacture.

An object of my invention is to overcome the difficulties mentioned by providing a bending machine of a novel character for preparing the ends of the bars or beams for the curving operation between the bending rolls so that the bar or beam will have true circular form throughout when it leaves the forming roll; and further to provide a forming machine for bending the opposite ends of the bars or beams to true circular form prior to the operation of bending the entire bar to circular form.

A further object of the invention is to provide a machine for bending a continuous bar to curved form, and severing the bar at a point between the ends of each curved section to provide lengths having curved ends which conform to the true circular contour of the chime rings to be manufactured.

A still further object of the invention is to provide a combined forming and cutting machine of the character referred to, in which the bending dies cooperate with cutting or shearing means for severing the bars.

Still another object of the invention is to provide bending dies in conjunction with shearing means and wherein portions of the shearing means are yieldably mounted to accomplish shearing of the bars while the same are being bent.

Yet another object of the invention is to provide bending and shearing means wherein the shearing means co-operate in progressive steps to shear the bar part way through at successive points during the co-operating movements of the shearing means and bending dies.

A still further object of the invention is to provide a combined bending and cutting machine wherein improvements are provided for automatically controlling the movement of the bending and shearing means to effect a single operative stroke, or as many operative strokes as desired, said means including novel clutch mechanism and automatic brake devices for governing the operation of the machine.

Other and further objects of the invention will more fully and clearly appear from the description and claims hereinafter following.

Figure 12:
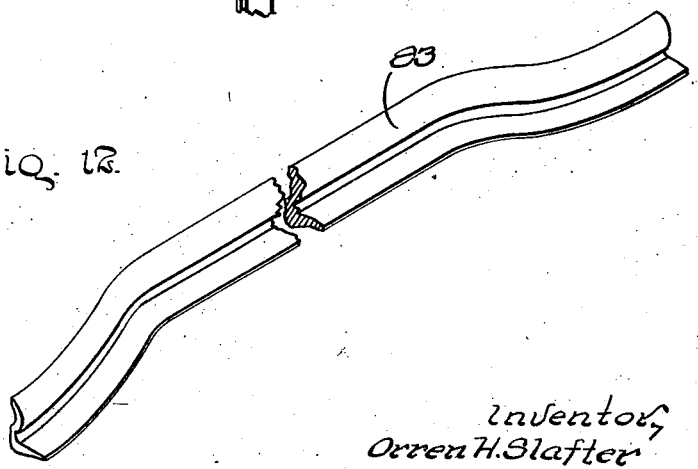
Figure 10:
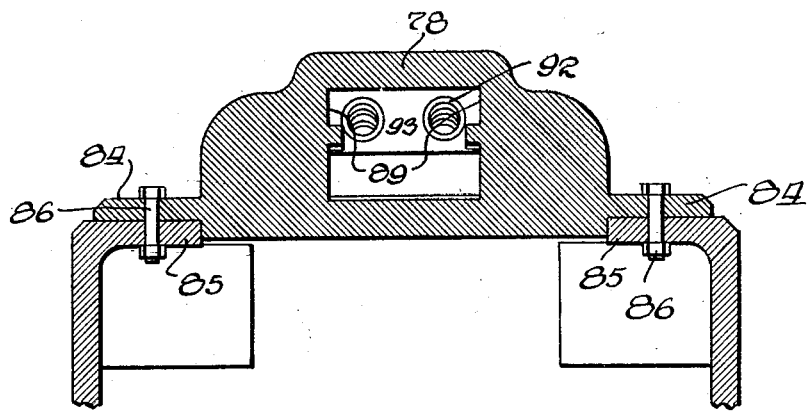
Figure 11:
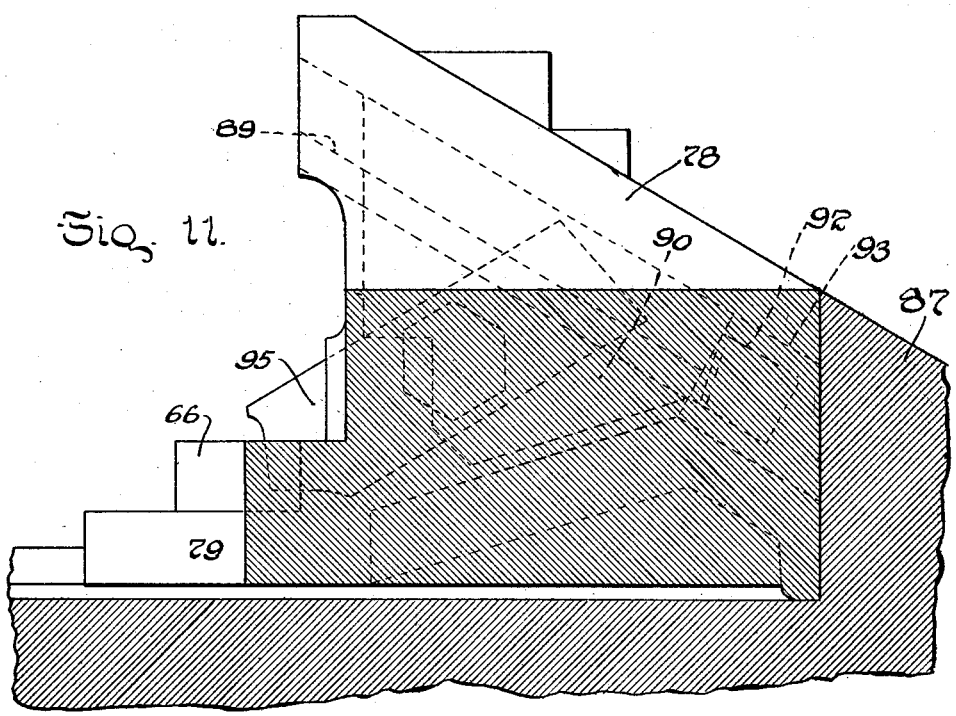

In the drawings forming a part of this specification, Figure 1 is a top plan view of my improved machine. Figure 2 is a side elevational view of the machine illustrated in Fig. 1, showing the side of the machine upon which the brake mechanism is mounted. Figure 3 is a side elevational view of the machine, viewing the same from the side opposite to that shown in Figure 2. Figure 4 is a vertical, longitudinal sectional view of the invention corresponding substantially to the line 4—4 of Fig. 1. Figure 5 is a transverse vertical sectional view of the invention corresponding substantially to the line 5—5 of Fig. 4. Figure 6 is a side elevational view of the brake mechanism utilized in connection with the invention, and showing parts of the same in vertical section. Figure 7 is an enlarged top plan view of the forward portion of the machine. Figure 8 is an enlarged longitudinal vertical sectional view through the bending dies and shearing means, corresponding substantially to the line 8—8 of Fig. 7, showing the position of the shearing blade when the same initially engages the bar to be cut, the dotted lines showing the bar indicating the position of the end portions thereof. Figure 9 is a view similar to Fig. 8, showing the bar farther advanced than in Fig. 8, in full lines, disclosing the actions of the shearing blade when coming into contact with the bar to cut the upper portion thereof and in dotted lines showing the position assumed by the shearing blade after the bending die has advanced the bar to a point where the upper part thereof has been completely cut and the lower portion about to be cut upon further movement of the parts. Figure 10 is a transverse vertical sectional view corresponding substantially to the line 10—10 of Fig. 7. Figure 11 is an enlarged view of the forming head showing the manner in which the same is mounted upon the frame. And Figure 12 is a perspective view of the bar after the same has been bent and severed by the operation of the bending dies and shearing means.

As shown in the drawings, the operative mechanism of the invention is mounted upon a cast frame or support comprising a pair of spaced walls 15—15, the lower edge portions of which are provided with outwardly turned flanges 16, adapted to rest upon the floor or other support upon which the frame may be mounted. The frame is provided with a front wall 17, connecting the side walls 15—15, said front wall being provided with an aperture to permit the insertion and removal of a receptacle for receiving the cut-off lengths of the bar operated upon. The frame includes a rear wall 19, connecting the opposite ends of the said walls 15—15, which supports a bracket 20 upon which an electric motor, indicated at 21, is supported. The motor is provided with a pinion 22 secured to its armature shaft, which meshes with a large gear wheel 23, keyed to one end of a shaft 24, carried by suitable bearings 25 formed upon the upper ends of the side walls 15—15 of the frame. The opposite end of the shaft 24 carries a small gear wheel 26, which meshes with a relatively large gear wheel 27 carried upon the adjacent end of the crank shaft 28. The crank shaft 28 is supported upon the upper ends of the side walls 15—15 of the frame, and is held in position in suitable bearings indicated at 29—29, spaced forwardly a suitable distance from the bearing members 25 which support the shaft 24. Mounted upon the end of the shaft 28 which projects outwardly from the gear wheel 27 is a collar 290 provided with a flange 30. Splined upon the collar 290 is a clutch part 31 provided with a clutch member 32 which is adapted to be engaged by a clutch member 33 carried by the gear wheel 27. The clutch part 31 is normally held in engagement by means of springs 34 interposed between the outer end of the clutch part 31 and the flange 30 upon the collar 290. The clutch part 31 is provided with a groove 35, having a laterally disposed off-set 36, adapted for the reception of a roller 37 carried at one end of a rod 38, mounted for rotation and vertical reciprocation. The rod 38 is carried by a bracket 39 mounted upon the adjacent side wall 15 of the frame, and extends downwardly to a point where it is connected with a lug 40 formed upon a treadle lever 41, as indicated at 42. The lever 41 is pivotally carried by a stud 420 formed upon an extension 33 upon the side wall 15 of the frame, and extends rearwardly of said stud a suitable distance, and at the extreme end of the extension is provided with a weight 43 normally tending to raise the operating portion 44 of the lever and the rod 38 which carries the roller 37. A weighted member 45 is provided which is pivotally carried upon a pin 46 mounted upon the bracket 39. An extension upon the weighted member 45 is connected with the shaft 38 as indicated at 460, the combined effect of the weights 43 and 45 serving to press the shaft or rod 38, and consequently the roller 37, normally into the groove 35 of the clutch member 31. By this arrangement the roller 37, assuming the same to be in its normal position in its groove 36 of the clutch member 31 serves to pull the clutch member 31 outwardly once for every revolution of the crank shaft 28. When it is desired to permit the machine to run continuously, the treadle 44 is depressed, removing the roller 37 from the groove 35, so that the clutch part 31 and clutch member 32 will be pressed inwardly to bring about continuous engagement of the clutch member 32 with the clutch member 33 on the gear wheel 27.

Upon the opposite end of the crank shaft 28, upon the portion indicated by the numeral 47, is an arrangement for exerting a braking effect upon the shaft 28. Said braking arrangement includes a drum 48 secured to the portion 47 of the shaft 28. Said drum is provided with a transversely extending groove 49, in its peripheral edge, adapted for cooperation with mechanism for operating the brake as hereinafter described. Disposed about the drum 48 is a pair of brake band sections 50 and 51, both of which are pivotally carried at the lower ends upon a pin 52 mounted upon the adjacent side wall 15 of the frame, each of said bands being provided with a suitable lining as indicated at 530, adapted to engage the surface of the drum 48. The opposite ends of the brake bands 50 and 51 are provided with turned portions 53 and 54 which slidably accommodate a bolt 55 extending therethrough. Each of the portions 53 and 54 is provided with a socket for the reception of a coiled spring 56 disposed about the bolt 55, the inner end of each of the springs 56 bearing upon the bottom wall of the related socket, and the outer end being accommodated in a cup-shaped member 57 held in position by a nut 59 threaded upon the bolt 55. Pivotally mounted upon the turned portion 53, as indicated at 60, is a rocker arm 61 carrying at its end a roller 62, which is normally seated through the influence of springs 56 in the groove 49 in the drum 48. When the drum 48 is rotated the roller, moving out of the groove 49 and bearing upon the circumferential periphery of the drum, serves to move the roller 62 into engagement with the adjacent surface of the portion 54 on the brake band section 51, thereby pressing the bands 50 and 51 apart to remove the braking pressure from the drum, said pressure being automatically reapplied when the roller 62 again enters the groove 49, when said brake bands are again free to be held in braking relation with respect to the drum through the medium of the springs 56. The groove 49 is arranged to coincide in position with the off-set 36 in the clutch 35, so that when said clutch is thrown out of engagement, the roller 62 is just entering the groove 49 to permit braking pressure immediately following the disconnection of the clutch member 35.

The crank shaft 28 is provided with a centrally disposed crank 63 on which a connecting rod 64 is journaled. The end of the connecting rod 64, remote from the crank of the crank shaft, is pivotally connected by a horizontally extending pin to the reciprocating cross-head member 65. The connecting rod 64 is preferably made adjustable in length so that the position of the cross-head 65, with respect to the female dies 66, may be accurately determined. This adjusting means may consist of socket members 67 and 68 connected by a screw 69, the member 68 forming part of the portion connected to the cross-head 65 and the member 67 being rotatably journaled upon the crank 63 by a suitable bearing.

The crosshead, as most clearly shown in Figures 1, 2, 4, 7 and 8, is in the form of a relatively heavy block slidably mounted in suitable longitudinally extending guides formed in the top edges of the side walls 15—15 of the frame, the top wall of one of the guides being formed by a removable plate 72 bolted to the top edge of the related wall 15, serving to permit assembling and disassembling of the cross-head. The cross-head 65 is of the shape best indicated in Figures 1 and 7, being larger at its forward end than at the rear end, and a roller 71 is mounted at one forward corner of the block as shown.

The cross head 65 at its forward portion is provided with a centrally disposed recess 73 to accommodate a pair of male bending dies 74, said dies being of such form that when arranged within the recess 73 they are spaced apart so as to provide a space 75 therebetween for the reception of a shearing blade hereinafter referred to. The forward convex faces of the die sections 74—74 are curved, as indicated at 76, along an arc which corresponds to the radius of the chime ring when the same is in its final form. The die sections 74—74 are rigidly secured in position by means of a plurality of bolts, indicated at 77.

The female dies 66 are mounted upon a forming head, indicated broadly by the reference character 78. The forming head 78 has a support 79 upon which the female forming dies 66 are mounted, said dies comprising separate sections bolted in position on the forming head, and are spaced apart as indicated at 80 to provide clearance for a shearing blade carried by the forming head. The concaved surfaces 82 of the female dies 66 conform in radius to the arcs described by the convex surfaces of the male dies 74, and the work, in the form of the bar 83, is adapted to be extended between the concave and convex surfaces of the male and female dies during operation of the machine.

The forming head 78 is rigidly mounted in position upon the frame by means of laterally projecting flanges 84 which fit upon suitable flanges 85 formed upon the upper end portions of the side walls 15—15, and secured in position by bolts 86. The forming head 78 is backed up by an abutment 87 extending transversely across the adjacent end of the frames of the machine, and preferably formed integrally therewith. The central portion of the forming head 78 is provided with longitudinally extending upwardly inclined guides 89 adapted for the reception of a shearing blade holder 90, said holder having flanges 91 which are slidably mounted in the guides 89. The rear end of the blade holder 90 bears upon a pair of coiled springs 92, which in turn bear upon blocks 93, the latter extending through the rear of the forming head into abutment with the abutment member 87, on the frame of the machine. The blade holder is provided with a groove 94 for the reception of the cutting blade 95, said groove being inclined downwardly, as best shown in Figs. 4, 8, 9, and 11, the blade 95 being held in position by a bolt 96 in the groove of the holder, so as to project downwardly in an inclined direction toward the work, and between the concave forming dies 66—66 and beyond the forming surfaces of the same. The forward end of the knife blade is of irregular formation, being provided with an upper portion 96, which conforms to the upper portion 97 of the bar 83, while the lower portion of the forward edge of the blade is beveled as indicated at 97, and is adapted to co-operate with the flange 98 upon the bar 83.

In operation, power is supplied to the machine by means of the motor 21, which power is transmitted through the large gear wheel mounted upon the shaft 24, to the pinion 26 upon the opposite end of said shaft, and thence through the gear wheel 27 to the clutch member 31. As heretofore described, the clutch member 31 is normally held in its innermost position by means of the springs 34, causing engagement between the clutch fingers 32 and 33. The roller 37 is normally held in the groove 35 of the clutch member 31 under the influence of the weighted member 45 and the weighted treadle 41. Due to the presence of the roller 37 within the slot 35, after the clutch part 31 has rotated one revolution, the roller 37 comes into the cam portion 36 of the groove, serving to press the clutch member 31 outwardly against the tension of the springs 34, thereby disconnecting the clutch fingers 32 and 33, but immediately the roller passes the cam portion 36 of the slot the clutch member 31 moves inwardly again under the influence of the spring 34, and is in position to again cause engagement of the clutch parts 32 and 33.

The brake mechanism is mounted on the shaft 28 opposite to the end upon which the clutch member 31 is mounted. The springs 56 normally press the free ends of the brake bands 50 and 51 tightly about the drum 48, during the time that the roller 62 on the crank arm 61 is in the groove 49 of said drum, which position of the parts bears a certain relation to the cam portion 36 of the clutch part 31, whereby the roller 62 enters the groove 49 immediately following the disconnection of the clutch from its driving relation to the crank shaft 28, thereby stopping the crank shaft 28 as soon as the clutch is disconnected. When the clutch is re-engaged rotation of the shaft 28 causes the roller 62 to ride out of the groove 49 on to the circumferential periphery of the drum 48, this action serving to move the roller 62 between the turned portions 53 and 54 of the brake bands, thereby separating the same and permitting the drum 48 on the shaft 28 to run free. When the treadle 44 is depressed, withdrawing the roller 37 from the groove 35 of the clutch member 91, the mechanism will run continuously without stoppage at stated intervals, the power generated by the motor and transmitted to the shaft 28 serving to assure the roller 62 moving out of the groove 49 of the drum 48; or any suitable manually operable means may be provided for holding the roller out of the groove 49 to prevent setting of the brakes while the machine is continuously operated.

The rotation of the crank shaft 28 through the crank member 63 serves to impart a reciprocating movement to the cross-head 65, which is pivotally connected to the crank shaft by the adjustable connection 64. The cross-head 65 carries the male bending dies 74. These dies are spaced apart a suitable distance, and form shearing members, indicated at 75, between which is adapted to project the shearing blade 95. Upon the forward stroke of the cross-head 65 the work, in the form of the bar 83, which has previously been inserted between the male dies 74 and female dies 66, is carried by the male dies toward the female dies, and the unbent chime steel bar is engaged by the female dies adjacent the outer ends thereof, and by reason of contact with the bar 83, the holder 90 for the blade 81 is forced somewhat backward and downward by the inclined guides 89—89 of the forming head, the blade 95 pressing against the upper curved portion of the bar 83. In this position the blade begins to shear the partially curved portion of the bar 83, while said bar is bending into the forming surfaces of the female dies 66. Said shearing of the upper portion of the bar, and bending of the same, is accomplished because of the clearance of the blade 95 above the lower flange 98 of the bar 83. The beveled portion 97 of the shearing blade upon the further forward travel of the cross-head and consequent rearward action of the blade holder 90, causes the beveled portion 97 of the blade to pass through the flange 98 and lower portion of the bar 83, this occurring when said bar 83 has been approximately completely bent to form, and the blade holder 90 halted due to the blocks 93 coming into engagement with the abutments 87.

When the bar 83 has been bent and cut the same is advanced the required distance and the operation repeated. In this way matched sections are produced which may be rolled into hoop shape and made ready for welding.

Attention is called to the fact that by the above described arrangement the shearing blades moves in two directions so that the same cuts or shears different portions of the peculiarly formed chime bar at different times during the bending operation, that is, shears the upper portion of the bar while the bar is being bent, and finally shears the lower portion of the bar approximately at the end of the bending operation, this action being made possible by reason of the travel of the shearing blade. By means of the clutch and brake arrangement the machine may be controlled so that it will temporarily stop its operation after each forming and cutting movement of the parts, enabling the machine to be automatically intermittently operated, or if desired the machine may be run continuously, without stoppage between the bending and cutting operations.

While I have herein shown and described what I now consider the preferred manner of carrying out my invention, the same is merely illustrative and I contemplate all changes and modifications that come within the scope of the claims appended hereto.

I claim:

1. In a machine of the character described, the combination with bending dies adapted to accommodate a bar of angular cross-section; and shearing means including a blade having a shearing surface conforming to one angular portion of said bar, and a shearing surface conforming to the other surface of said bar, said shearing mechanism being operable to move said blade to sever first one angular portion and then the other during the bending operation.

2. In a machine of the character described, the combination with work forming means for carrying a bar to be cut; of shearing means including a shearing blade arranged to cut through one portion of the work in one direction, and movable to cut through the remaining portion of the work through movement in a different direction.

3. In a machine of the character described, the combination with work forming and supporting means; of shearing means associated therewith including a shearing blade; means for advancing the work toward said shearing blade; means for guiding said shearing blade to move in a direction across said work; and means for resiliently resisting movement of said shearing blade when the work is advanced against the same.

4. In a machine of the character described, the combination with male and female bending dies, one of said dies being movable, said dies being adapted to operate upon work placed therebetween; and shearing means cooprating with said dies and including a shearing blade yieldably supported adjacent one die and arranged to move at an angle to the movement of said bending dies to sever said work intermediate the bent portion thereof.

5. In a machine of the character described, the combination with a reciprocating bending die and a cooperating bending die; a yieldably mounted cutting blade co-operating with said reciprocating die to cut material operated upon by said bending dies.

6. In a machine of the character described, the combination with a reciprocating cross-head; of bending die members carried by said cross-head and secured thereto in separated position to provide clearance for a shearing blade; a forming head carrying bending dies adapted to co-operate with the bending dies of said cross-head, said co-operating dies being spaced apart to provide clearance for the shearing blade; and a shearing blade mounted on said forming head and movable with reference thereto, said shearing blade being adapted to project within the clearance provided by the dies on said cross-head and forming head to cut work operated upon by said dies.

7. In a machine of the character described, the combination with a frame; of a reciprocating cross-head mounted on said frame and carrying forming dies; of a forming head mounted on said frame and carrying dies adapted to co-operate with the dies of said cross-head; a shearing blade extending at an angle to the movement of the dies of said cross-head and forming head; and means for yieldably supporting said shearing blade upon said forming head, and including elements for guiding said blade along a path arranged at an angle to the movement of said forming dies.

8. In a machine of the character described, the combination with a reciprocating cross-head adapted to carry a bending die; a forming head adapted to carry a co-operating bending die; operating means for reciprocating said cross-head, said operating means including a rotary driving shaft having a driving connection with said cross-head; means for driving said shaft, said means including a clutch automatically disengageable after each revolution of said shaft; and automatic brake means for stopping said shaft after each revolution thereof immediately following disconnection of said clutch.

9. In a machine of the character described, the combination with a crank shaft for driving a reciprocating bending die; of means for driving said shaft; a clutch automatically operable to disengage said driving means following a predetermined movement of said shaft; and automatic brake means co-operating with said shaft and adapted to stop the same immediately following disconnection of said clutch, said brake means including a drum on said shaft provided with a groove in its circumferential periphery, and brake bands pivoted adjacent one set of ends extending about said drum and yieldably pressed together at their opposite set of ends, there being a roller connected to said latter ends and operated when entering the groove in said drum to permit approach of the brake bands to set the brake, said roller operating to bear upon the remaining peripheral portion of the drum and spread the brake bands against the yielding pressure exerted thereon.

In witness that I claim the foregoing I have hereunto subscribed my name this 11th day of June, 1928.

ORREN H. SLAFTER.